March 13, 1945.  J. J. TOMALIS ET AL  2,371,365
LOCKING SCREW AND METHOD OF MAKING
Filed Dec. 7, 1942
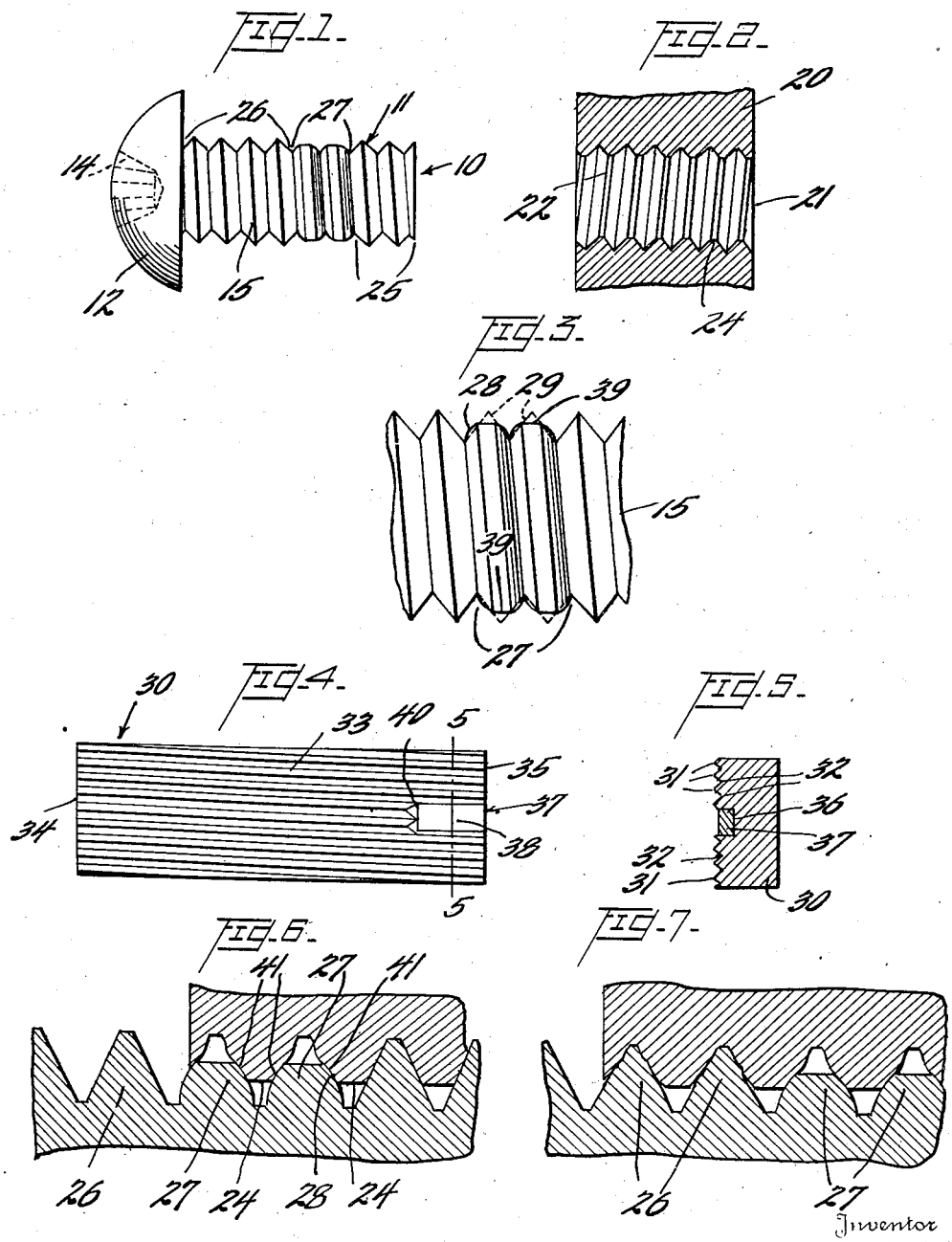
Inventor
Joseph J. Tomalis
Herman A. Muenchinger
By Watson, Cole, Grindle & Watson
Attorney Patented Mar. 13, 1945

2,371,365

UNITED STATES PATENT OFFICE 2,371,365

LOCKING SCREW AND METHOD OF MAKING

Joseph J. Tomalis, Providence, and Herman G. Muenchinger, South Foster, R. I., assignors to American Screw Company, Providence, R. I., a corporation of Rhode Island Application December 7, 1942, Serial No. 468,150

7 Claims. (Cl. 80—61)

This invention relates to fastening elements and more particularly to screws of the self-locking type and to a method of making the same.

It is a general object of the present invention to provide a novel and improved screw of the self-locking type and method of making the same.

More particularly it is an object of this invention to provide a self-locking screw of extremely simple construction capable of being formed in a single operation and including a continuous thread having end sections of several turns each of a normal or conventional thread and an intermediate section of one or more turns of a distorted thread capable of binding against the walls of a mating thread which is constructed for normal working operation with the threads on the end sections of the screw.

One of the important features of the invention comprises the single operation formation of all of the threads on the screw including a working of the metal to harden the same so that it is capable of distorting the metal of a nut formed of the same material and threaded by a normal tapping operation.

A further important feature of the invention includes the construction of a screw having the ability to start easily in a normally tapped hole and to subsequently lock itself in the tapped hole by partially distorting a portion of the thread of the latter.

An additional important feature consists in the arrangement of the distorted threads of the screw to have the same profile area as that of the undistorted thread and arranged between full turns of the latter so that as the screw is driven the tapped threads are molded to conform to the profile of the distorted threads and subsequently the molded threads at the entrance to the tapped hole are returned toward normal by undistorted threads on the screw, serving thus to create an additional locking action between the terminal normal threads on the screw and the previously distorted entrance threads in the tapped hole.

Other and further features and objects of the invention will become more apparent as the description proceeds in the following specification when considered along with the accompanying drawing wherein is disclosed a single exemplary embodiment of the invention with the understanding that such changes may be made therein as remain within the scope of the appended claims without departing from the spirit of the invention.

In said drawing:

Figure 1 is an elevation of a self-locking screw constructed according to the present invention;

Figure 2 is a longitudinal central section of a portion of metal, such as a nut, drilled and tapped to receive the self-locking screw;

Figure 3 is a fragmentary elevation on an enlarged scale of several normal turns and several turns of distorted thread on the self-locking screw prior to use;

Figure 4 is a face view of one of the rolling dies used in forming the threads on a screw constructed in accordance with the present invention;

Figure 5 is a section on line 5—5 of Figure 4 showing the truncating insert for the die;

Figure 6 is a section on an enlarged scale of a thread such as provided on the screw of the present invention entering a tapped hole, the distance of insertion being equivalent to the length of the entering and undistorted thread and all turns of the distorted thread; and, Figure 7 is a view similar to Figure 6, showing the screw further inserted to the extent of two full turns on the terminal section.

Locking screws capable of automatically retaining themselves in position in tapped openings have been heretofore proposed and their types of construction are numerous. In most cases they rely on friction between the threads of the screw and the tapped hole. This friction results from different arrangements of the threads in accordance with the several proposed schemes and includes such devices as making the thread on the screw slightly larger than the thread in the hole, tapering the thread on the screw so that it becomes tight near the end of its insertion, distorting the final turns of the screw in one manner or another so that they bind with the entrance threads in the hole and so on. Most of these devices suffer from one or more faults. Those relying on friction of oversized or tapered threads cause such distortion of the thread in the tapped hole so that while they hold satisfactory for the first time, upon re-use their hold is materially reduced and they are subject to loosening the same as an ordinary screw. Some of the other types not only have this fault but require special manufacturing machinery, several operations for the formation or distortion of the thread and so on. No one of them has been sufficiently successful to become a commercial product for large scale use and resort is usually had to lock washers and similar devices.

In accordance with the present invention a self-locking screw is provided, the threads of which can be formed in a single operation, not substantially different from the normal thread rolling operation used in the formation of well over half of all small machine screws. The screw is tightly self-locking and can be used and re-used in the same tapped opening with always the same effective locking effort. While the screw has been primarily constructed for use in securing spigot washers to the rotatable stem in domestic plumbing fixtures, it is obvious that it can be applied equally as well to a great many other applications. It works best in a relatively deep tapped hole formed in material of substantially the same degree of hardness as that from which the screw is made but there are no such definite restrictions to its satisfactory use.

Referring now to the drawing, it will be seen that the screw 10 is provided with a shank 11 of any suitable length and diameter and any desired form of head, shown illustratively as the round or button type 12, provided with a suitable recess 14 for receiving a screw-driver. The main portion of the thread 15 on the screw is preferably one of the standard V-types such as the conventional 60° machine thread. The metal part 20 shown in Figure 2 and provided with a hole 21 for receiving the screw is internally threaded for its full depth with the same V-type thread 22. It is preferred that the pilot hole for the original insertion of the tap be of such size as to give approximately 80% of the full thread depth leaving the crests of the threads in the tapped hole slightly truncated as shown at 24.

On the screw the conventional V-thread 15 is applied in two sections, one on the portion designated 25, hereafter termed the entering or end section and comprising preferably at least two full threads for ease in starting the screw in the tapped hole and the section designated 26, hereafter called the terminal section. Intermediate these two sections is the distorted section 27 preferably consisting of at least one full thread and not substantially more than two.

The root diameters of all of the threads on the screw are the same, the pitch or lead is constant for the full length thereof and in the sections 25 and 26 the crest diameters of all of the turns are the same and the flank shapes are identical. In the section 27, however, the crests are truncated and the flanks rounded so that in profile, as seen in Figure 3, they extend out at 28 beyond the dotted line profile 29 of the normal shape of the other threads to provide areas which will frictionally engage the walls of the mating thread and serve to provide the locking action which will be later described.

The curved profile of the distorted threads 27 has the same area of cross section as the profile of an undistorted thread. These distorted threads are first formed in the normal manner to a full V-shape and then by pressure on the crests are truncated and the flanks widened and convexed. This operation is preferably carried out as an integral portion of the threaded rolling operation. Threads are commercially rolled on machine screws by moving the shanks individually between two facing, grooved dies, each provided with suitably inclined and shaped ridges and valleys to form the threads by a rolling or swaging operation, the crests of the threads being raised up from the blank and the roots impressed therein so that the finished screw has a crest diameter greater than that of the initial blank. The forming dies normally are of a sufficient length to represent several times the circumferential length of the shank to insure the forming of clean, sharp, well-shaped threads.

One such die, modified in accordance with the present invention, is shown in Figures 4 and 5 as comprising a block 30 of hardened steel provided with the ridges 31 and valleys 32 spaced in accordance with the desired lead of the thread on the screw and inclined across the face of the die as shown at 33 in Figure 4 to impart the desired helix to the thread. Between the entering end 34 first engaged by the blank and the terminal end 35 the die is several times the length of the circumference of the blank. To modify such a die to produce the screw of the present invention a small rectangular section at the terminal end and intermediate the width is cut away as shown at 36 and a block 37 of hardened steel inset so that its face 38 is sufficiently above the valleys to provide the desired truncation 39 for the distorted threads.

It will be seen that a screw rolled between a pair of dies such as shown at 30 will first have formed on the desired portion of the blank, not necessarily the full length thereof as shown in Figure 1, a continuous uniform equally pitched V-type thread but that shortly before leaving the dies several turns of thread intermediate the ends will be subjected to radial pressure on the crests by the flat surfaces 38 which crests will be flattened down to bulge the flanks to the convex form shown in Figure 3. It will be noted that the already severely worked metal of the V-threads is further manipulated by these flat surfaces in the dies to additionally harden the distorted threads which contributes to the peculiar action of the screw as will be subsequently described. It is preferred to provide a merging section 40 between the flat die surface 38 and the screw threads on the main portion of the die so that there is a gradual transition from the V to the truncated thread to increase the ease of insertion and removal of the locking screw by insuring against any cutting action such as might take place if sharp edges occurred at the junction of the two styles of threads.

As previously stated it is preferred that the screw be inserted in a deep tapped hole formed in metal of approximately the same hardness as that of the screw blank before rolling. This insures that the finished screw will have a much harder thread than that in the tapped part because of the working thereof previously described, in contrast with the simple cutting of the threads in the hole. The first several threads on the entering section 25 have a standard working fit into the tapped hole for ease in starting the screw but thereafter the distorted threads come into engagement with the first threads in the hole as seen in Figure 6. These threads 27 with their bulging flanks 28 engage and mould the metal of the threads in the tapped hole as shown at 41, the truncated tips 24 of the tapped threads providing some clearance for this purpose. This moulding causes a tight friction fit which will hold the screw in the hole against any ordinary or accidental efforts to remove the same.

When the screw is driven still further into the hole, so that several of the undistorted threads of the terminal section also engage those in the tapped hole, the conditions become as shown in Figure 7 where the threads 27 have moulded the metal of the deeper tapped threads in the hole exactly as described in connection with Figure 6 and the undistorted threads 26 of the terminal section have now moved in to engage the first two threads of the tapped hole which were previously moulded by threads 27. These V threads then attempt to bring the moulded tapped threads back into normal shape to fit them, resulting in some minor moulding of the V threads on the screw and a peculiar shaping of the tapped threads which is shown slightly exaggerated in the drawing. Thus, in addition to the frictional locking of the threads 27 and the mating threads in the tapped hole there is the additional locking provided between the now remoulded top threads in the tapped hole and the terminal threads on the screw providing a very adequate locking action. An attempt to loosen the screw requires a reversal of the above process necessitating considerable effort.

When the screw is withdrawn the process above described is reversed and the entering threads attempt to reform the threads in the tapped hole to the V shape as they are withdrawn behind the distorted threads thus conditioning the tapped threads for re-use when the screw is re-inserted. Because of the relative softness of the threads in the tapped hole this operation can be performed several times without seriously detracting from the locking action of the same screw in the same tapped hole. This is of particular importance where used in the securing of spigot washers which must be replaced from time to time and which by the nature of the operation of the spigot tend to apply a loosening force to the screw.

From the above it will be appreciated that the beneficial action of the present screw is provided primarily because of the location of the distorted thread between two sections of normal thread each comprising several turns, and is independent of the length of the screw or the depth of the tapped hole.

Having thus described the invention, what is claimed as new and desired to be secured by Letters Patent is:

1. A machine screw having a thread extending for a plurality of equal pitched turns along its shank, the root diameters of all of the turns being the same, the crest diameters of several contiguous turns intermediate the ends of the threaded portion of the shank being less than the crest diameters of the remainder of the turns and the area of metal in all turns, in any section taken through the longitudinal axis of the screw shank being equal.

2. A machine screw having a V-thread thereon extending for a plurality of equal pitched turns along its shank, all of said turns having uniform root diameter and except for several turns intermediate the ends having uniform crest diameter, said several turns having less crest diameter than the other turns and having continuous smooth convex flanks and broadened flat crests.

3. A fastening element comprising a body having a V-type thread thereon comprising a plurality of turns all having the same pitch and the same root diameter, there being at least one full turn of said thread intermediate the ends thereof having a wide crest of less diameter than the uniform diameter of the remaining threads, the flanks of said turn, in profile below the crest, extending out beyond the corresponding profile of any of the other turns.

4. A fastening element of the self-locking type comprising a body having a rolled V-type thread thereon comprising end sections each of a plurality of turns identical in pitch, root diameter, crest diameter, and flank shape and one or more intermediate turns of the same pitch and root diameter as the turns of the end sections, the intermediate turn being of the same profile area as any of the other turns but of different outline.

5. The method of making a self-locking fastener element including the steps of rolling a continuous uniform thread on the shank of said element, and then subjecting the crests of at least one turn of said thread intermediate end sections containing at least one full turn of thread to sufficient pressure to uniformly lower their crests and bulge their flanks into convex curves.

6. The method of forming a self-locking screw including the steps of rolling a continuous uniform V-type thread for a plurality of turns on the shank of said screw and then distorting the thread by lowering its crest and bulging its flanks into convex curves for at least one turn intermediate end sections of at least two full turns of the original thread.

7. The method of forming a self-locking screw including the steps of rolling the shank between threading dies to form a continuous uniform V-type thread thereon for a plurality of turns, and then by the same dies distorting at least one turn of the thread between sections of not less than two turns of undistorted thread by pressure on the crest thereof normal to the axis of the shank to lower said crest and bulge the flanks into convex curves.

JOSEPH J. TOMALIS.
HERMAN G. MUENCHINGER.